(12) United States Patent
Park et al.

(10) Patent No.: US 8,248,388 B2
(45) Date of Patent: Aug. 21, 2012

(54) TOUCH SCREEN PANEL

(75) Inventors: Dae Seo Park, Incheon (KR); Kwam Su Choi, Seoul (KR); Seung Gol Lee, Incheon (KR)

(73) Assignee: Inha Industry Partnership Institute, Incheon (KR)

( * ) Notice: Subject to any disclaimer, the term of this patent is extended or adjusted under 35 U.S.C. 154(b) by 677 days.

(21) Appl. No.: 12/392,265

(22) Filed: Feb. 25, 2009

(65) Prior Publication Data
US 2010/0097348 A1 Apr. 22, 2010

(30) Foreign Application Priority Data
Oct. 16, 2008 (KR) ........................ 10-2008-0101640

(51) Int. Cl.
*G06F 3/042* (2006.01)
(52) U.S. Cl. ...................... 345/176; 345/175; 178/18.09
(58) Field of Classification Search .................. 345/173, 345/175, 176; 385/31, 49, 50
See application file for complete search history.

(56) References Cited

U.S. PATENT DOCUMENTS
2010/0171717 A1* 7/2010 Hu et al. ........................ 345/173

FOREIGN PATENT DOCUMENTS
| JP | 08234895 | 9/1996 |
|---|---|---|
| JP | 2006011497 | 1/2006 |
| KR | 1020080070552 | 7/2008 |

* cited by examiner

*Primary Examiner* — Adam R Giesy
(74) *Attorney, Agent, or Firm* — Harness, Dickey & Pierce, PLC

(57) ABSTRACT

A touch screen panel is disclosed, which is capable of sensing an exact position touched by a user or instrument, or a pressured applied to the touched position, wherein the touch screen panel comprises a core including a plurality of horizontal and vertical lines provided in a grid shape, wherein the core has a first refractive index, and an upper surface of the core is exposed to the atmosphere; an intermediate clad formed between each of gaps included in the core, wherein the intermediate clad has a second refractive index which is lower than the first refractive index, and a height of the intermediate clad is identical to a height of the core; an optical source configured to apply an optical signal to an input end of each of the plurality of horizontal and vertical lines; and a plurality of receivers configured to sense an intensity of the optical signal passing through an output end of each of the plurality of horizontal and vertical lines, the optical signal applied by the optical source.

19 Claims, 18 Drawing Sheets

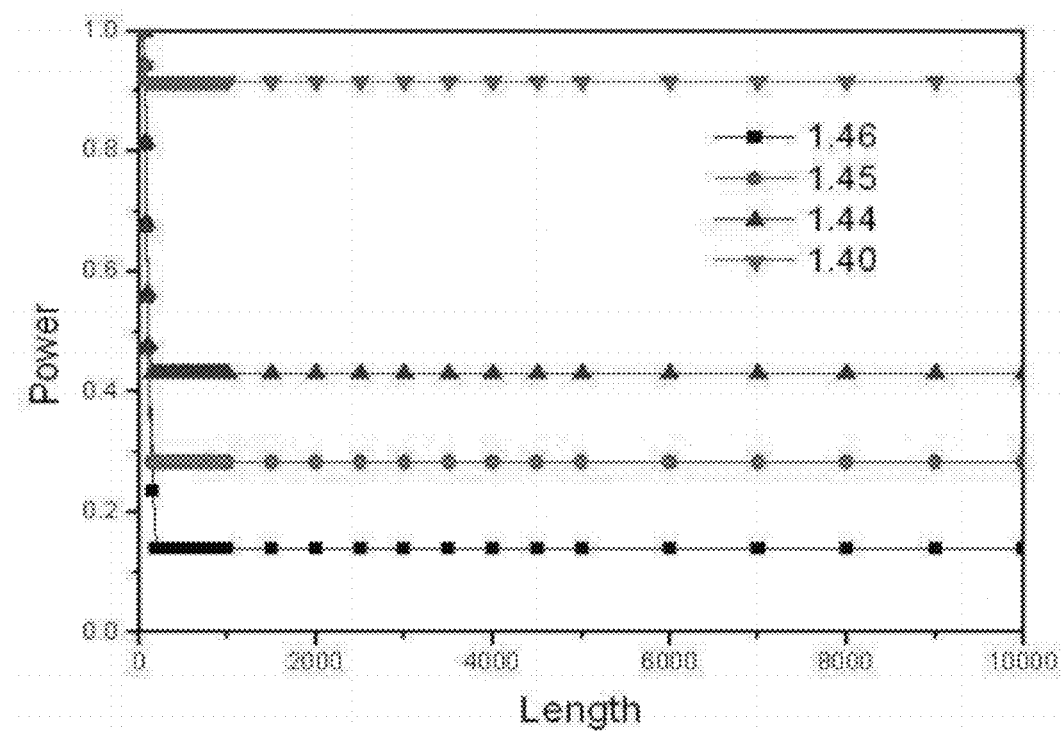

TOUCH SCREEN PANEL

This application claims the benefit of the Korean Patent Application No. 10-2008-0101640, filed on Oct. 16, 2008, in the name of inventors Dae Seo PARK, Kwan Su CHOI, and Seung Gol LEE, titled "Touch Screen Panel", which is hereby incorporated by reference as if fully set forth herein.

BACKGROUND OF THE INVENTION

1. Field of the Invention

The present invention relates to a touch screen panel, and more particularly, to a touch screen panel which is capable of sensing an exact position touched by a user or instrument, or a pressured applied to the touched position.

2. Discussion of the Related Art

A touch screen can perform a predetermined function by detecting a letter or location on a display screen when it is touched by a user's hand or passive object.

Generally, the touch screen is classified into a resistive type, a capacitive type, an infrared ray type (hereinafter, referred to as "IR type"), and a surface acoustic wave type (hereinafter, referred to as "SAW type").

The resistive type touch screen is comprised of two substrates bonded to each other, wherein each substrate is coated with a transparent electrode. If a predetermined pressure is applied to a predetermined portion of the resistive type touch screen by a finger or pen, the two substrates are electrically connected at the predetermined touched portion through a contact of the two substrates at the predetermined touched portion. However, the resistive type touch screen has a problem of low light transmittance. In order to overcome this problem of low light transmittance, it is necessary for the resistive type touch screen to provide the more luminous screen. This requires an addition power, whereby battery efficiency becomes lowered. Also, since the two electrodes provided in the respective substrates have to be in contact by pressing the surface of the resistive type touch screen through the use of finger or pen, the resistive type touch screen has a problem of low endurance.

The capacitive type touch screen is operated by sensing a static electricity from human's body. However, the capacitive type touch screen is high-priced. In addition, the capacitive type touch screen does not work with a gloved finger or stylus pen.

The IR type touch screen using straightness of infrared rays can determine a touched portion according as a signal is not detected due to a cutoff by the finger or pen. However, the contaminated surface of IR type touch screen may cause a malfunction thereof. Also, the IR type touch screen necessarily requires an additional component such as a lens so as to obtain collimated beams.

The SAW type touch panel uses ultrasonic waves. That is, if the finger is touched on a predetermined portion of panel, some of the ultrasonic waves are absorbed into the touched portion. The SAW type touch panel can detect the touched portion through the decreased ultrasonic waves. Like the IR type touch screen, the contaminated surface of SAW type touch screen may cause a malfunction thereof. In addition, the SAW type touch screen does not work with a gloved finger or stylus pen.

SUMMARY OF THE INVENTION

Accordingly, the present invention is directed to a touch screen panel that substantially obviates one or more problems due to limitations and disadvantages of the related art.

An object of the present invention is to provide a touch screen panel including an optical grid with optical waveguides on a display device, which is capable of sensing a touched portion and a pressure applied to the touched portion through the use of information showing a lowered intensity of output light when touching the optical grid or applying a predetermined pressure to the optical grid.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a touch screen panel comprises a core including a plurality of horizontal and vertical lines provided in a grid shape, wherein the core has a first refractive index, and an upper surface of the core is exposed to the atmosphere; an intermediate clad formed between each of gaps included in the core, wherein the intermediate clad has a second refractive index which is lower than the first refractive index, and a height of the intermediate clad is identical to a height of the core; an optical source configured to apply an optical signal to an input end of each of the plurality of horizontal and vertical lines; and a plurality of receivers configured to sense an intensity of the optical signal passing through an output end of each of the plurality of horizontal and vertical lines, the optical signal applied by the optical source.

In another aspect of the present invention, a touch screen panel comprises a core including a plurality of horizontal and vertical lines provided in a grid shape, wherein the core has a first refractive index; an intermediate clad formed between each of gaps included in the core, wherein the intermediate clad has a second refractive index which is lower than the first refractive index, and a height of the intermediate clad is identical to a height of the core; an upper clad formed on the core and the intermediate clad so as to cover the core and the intermediate clad, wherein the upper clad has a fourth refractive index which is lower than the first refractive index; an optical source configured to apply an optical signal to an input end of each of the plurality of horizontal and vertical lines; and a plurality of receivers configured to sense an intensity of the optical signal passing through an output end of each of the plurality of horizontal and vertical lines, the optical signal applied by the optical source.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A and 4B are graphs showing experimental results related with refractive indices in a core and a clad;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a touch screen panel according to the present invention will be described with reference to the accompanying drawings.

Figure 1:
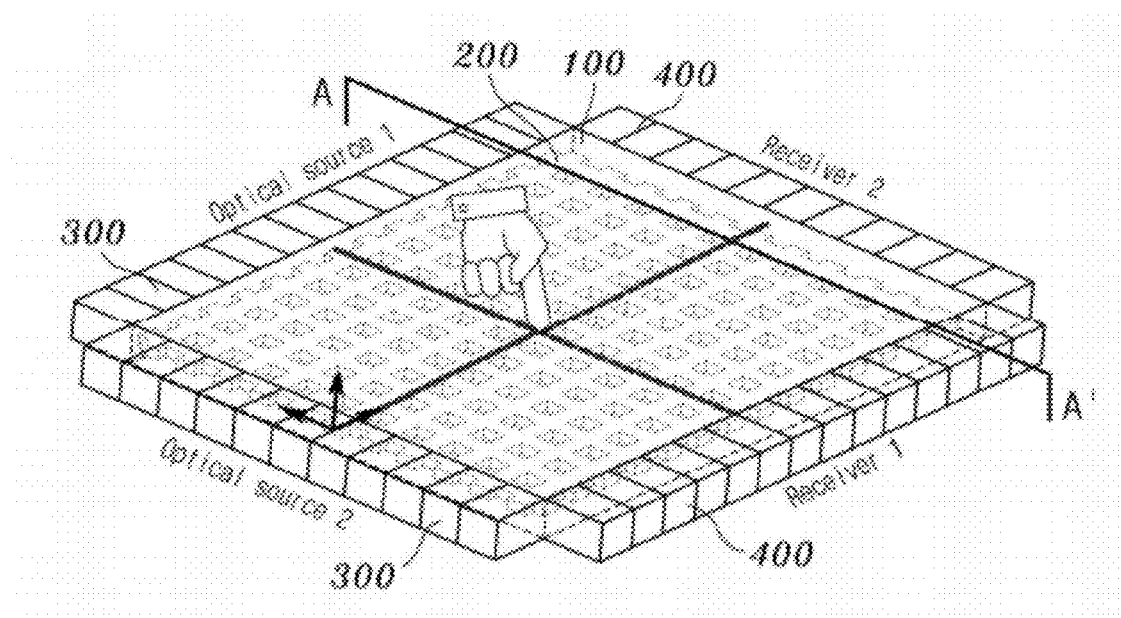
FIG. 1 is a perspective view illustrating a touch screen panel according to one embodiment of the present invention.
Figure 2:
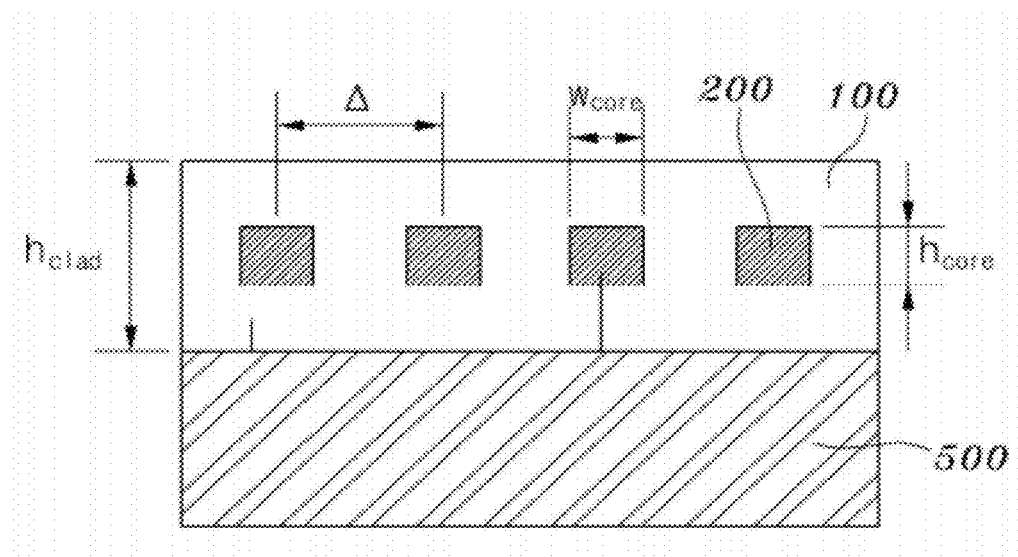
FIG. 2 is a cross section view along A-A' of FIG. 1.

FIG. 1 is a perspective view illustrating a touch screen panel according to the present invention, and FIG. 2 is a cross section view along A-A' of FIG. 1.

The touch screen panel according to the present invention basically uses an optical waveguide comprised of a core and a clad.

Referring to FIG. 1, the touch screen panel according to the present invention includes the clad 100, the core 200, an optical source 300, and a receiver 400.

First, the clad 100 is formed on an entire surface of a display panel 500, wherein the clad 100 is provided at a predetermined thickness. The clad 100 may be formed of a material which is capable of absorbing infrared rays (IR). Also, the clad 100 may be formed of a transparent material which enables propagation of light with the minimized loss, so that it is possible to realize an improved luminosity of image displayed through the display panel 500.

In the meantime, the clad 100 may be formed of a rigid material. However, the clad 100 may be formed of an elastic material so as to detect whether or not there is the presence of touch, or so as to sense an exact position of touched point, which will be explained as follows.

Next, the core 200 is formed in a grid shape inside the clad 200. As shown in FIG. 1, the core 200 is comprised of a plurality of horizontal lines and vertical lines on the same plane, wherein the horizontal and vertical lines intersect with each other.

In this case, after the light emitted from the optical source 300 is applied to each one end (hereinafter, referred to as "input end") of the plurality of horizontal and vertical lines included in the core 200, that is, the emitted light is applied to the input end, the light propagating through the other end (hereinafter, referred to as "output end") of each of the horizontal and vertical lines is sensed by the receiver 400.

Various exemplary shapes of the input and output ends will be briefly explained with reference to FIGS. 9 and 10.

First, the various exemplary shapes of the input end will be explained with reference to FIG. 9. The input end of the core 200 may have a general shape as shown in (a) of FIG. 9, or may have an inclined surface on its cross section as shown in (b) of FIG. 9. In this case, the inclined surface may be made of a mirror so as to improve reflection of the light.

Figure 9:
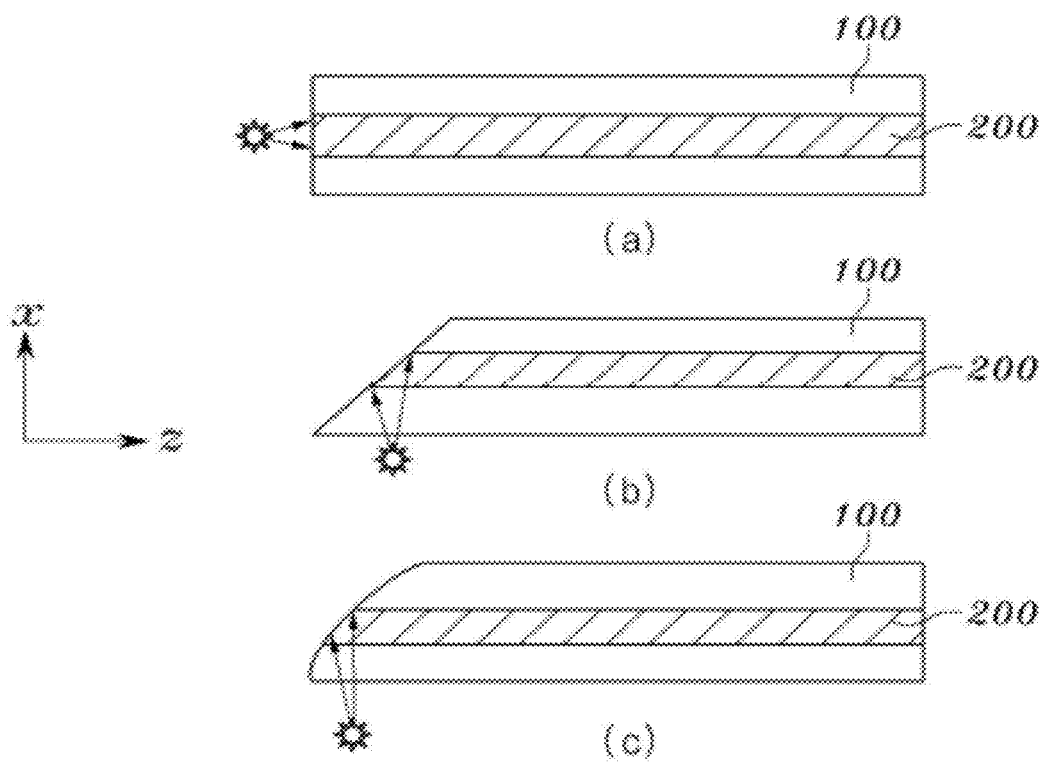
FIG. 9 illustrates various exemplary shapes of input ends for a core.

In another embodiment of the present invention, as shown in (c) of FIG. 9, the input end may be formed in a convex shape on its cross section which is favorable for the concentration of light emitted from the optical source 300 into the internal core 200.

In case of (b) and (c) in FIG. 9, the inclined surface on its cross section is directed toward a frontal side of the panel. Also, the light from the optical source 300 positioned under the core 200 is incident on the panel, and then the incident light is advanced toward the frontal side of the panel.

FIG. 9 shows that the input end of the core 200 is formed as the inclined surface. However, in a modified embodiment of the present invention, the output end of the core 200 also may have the inclined surface.

Figure 10:
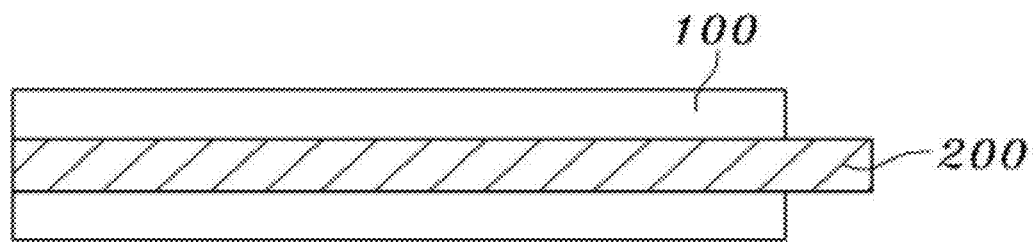
FIG. 10 illustrates one exemplary shape of an output end for a core.

Referring to FIG. 10 which shows one exemplary shape of the output end, the output end of the core 200 may be exposed to the external according as the output end of the core 200 protrudes out of the clad 100. In this case, the receiver 400 can detect only light propagating through the core 200 except for optical signal noises propagating the internal clad 100, so that it is possible to precisely measure an intensity change of output light. That is, the light to be leaked through the clad 100 is excluded and the output light propagating through the core 200 is detected through the use of receiver 400.

Also, the output end of the core 200 may be manufactured in a tapered shape. That is, the core 200 may increase or decrease in its width until the core 200 is connected with the receiver 400.

Referring once again to FIG. 2, a cross section made of the plurality of horizontal lines or vertical lines may be formed in a quadrangle shape, and more preferably, square. In one embodiment of the present invention, a cross section of the core 200 has a width (W_core) of 50 μm and a height (H_core) of 50 μm.

In the present invention, the optical waveguide is formed through the use of clad 100 and core 200. The optical waveguide according to the present invention may be a single-mode optical waveguide or multi-mode optical waveguide.

In the present invention, a refractive index in the clad 100 can be set to be different from a refractive index in the core 200. One embodiment of the present invention is characterized in that the refractive index in the core 200 is higher than the refractive index in the clad 100. According as the difference of refractive index between the clad 100 and the core 200 becomes larger, a critical angle of the optical waveguide becomes smaller, whereby an optical loss is decreased according as more light are capable of reaching the output end of the core 200.

Hereinafter, simulated results of the optical loss caused by the difference of refractive index between the clad 100 and the core 200 will be explained with reference to FIGS. 3 and 4.

Figure 3:
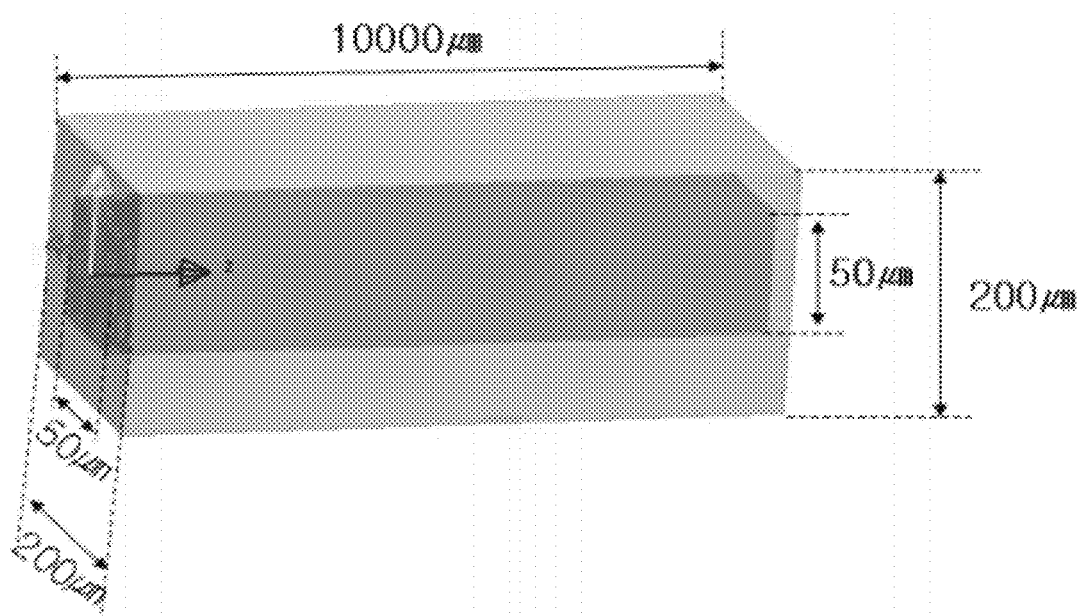
FIG. 3 illustrates a model size of a single optical waveguide.

In FIG. 3, a core size used in an experimental model is 50 μm×50 μm×10000 μm, and a clad size used therein is 200 μm×200 μm×10000 μm. Also, a diverging angle of the optical source is 30°, and a position of the optical source is expressed as the coordinates (0,0,0) through the use of point source. The number of rays is set as 10000. Also, as shown in FIG. 2, the core 200 is inserted into the internal of the clad 100, basically.

Figure 4A:
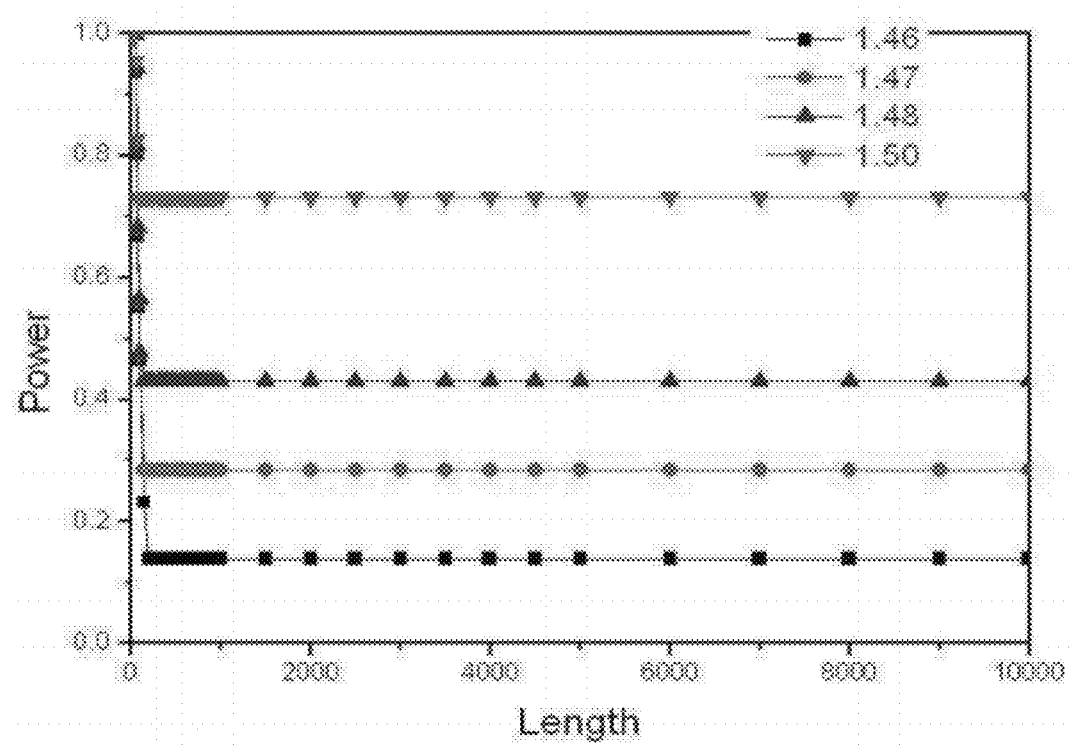

FIGS. 4A and 4B are graphs illustrating simulated results related with a change of optical power according to a propagation length due to the difference of refractive index between the clad and the core.

FIG. 4A is a graph illustrating the power (optical intensity) according to a propagation length when the refractive index of the core 200 is variably set at 1.46, 1.47, 1.48, or 1.50, while maintaining the refractive index of the clad 100 at 1.45.

FIG. 4B is a graph illustrating the power (optical intensity) according to a propagation length when the refractive index of the clad 100 is variably set at 1.40, 1.44, 1.45, or 1.46, while maintaining the refractive index of the core 200 at 1.47.

As shown in the graph for the simulated results, according as the difference of refractive index between the clad 100 and the core 200 becomes larger, the optical loss of the optical waveguide becomes more reduced. This is because that a total internal reflection (hereinafter, referred to as "TIR") condition is changed due to the difference of refractive index between the clad 100 and the core 200. That is, as the difference of refractive index between the clad 100 and the core 200 becomes larger, the critical angle of the optical waveguide becomes smaller. Thus, if the difference of refractive index in the predetermined diverging angle is too large, the optical loss is increased at the intersection point of the horizontal and vertical lines. In this respect, it is necessary to control the refractive indices for the clad 100 and the core 200 in consideration for the optical loss at the intersection point of the horizontal and vertical lines.

In one embodiment of the present invention, the refractive indices of the clad 100 and the core 200 may be set in a range between 1.3 and 1.7.

In this case, it is preferable that the core 200 have a step index distribution or graded index distribution.

For the plurality of horizontal and vertical lines included in the core 200, an interval (Δ) between each of the horizontal lines or between each of the vertical lines is set at minimum so as to avoid a directional coupling effect. For example, the interval (Δ) between each of the horizontal lines or between each of the vertical lines is set to be smaller than a size of a tip in a touch pen which is touched on a touch screen.

Supposing that the interval (Δ) of the optical waveguide is larger than the size of the tip in the touch pen. In this case, if the tip in the touch pen is touched on a gap between each pattern of the grid in the optical waveguide, it is impossible to detect the touched position.

In the meantime, if the interval between each pattern of the grid is too small, it may cause the directional coupling effect by interference between neighboring optical waveguides. Furthermore, in case of the small-patterned grid, there is the increased number of intersection points per unit length, whereby the intensity of output light is lowered due to increment of the cumulative loss by the intersection points.

Accordingly, the optical waveguides are arranged with the interval be smaller than the size of the tip of the touch pen. At the same time, since the increased number of intersection points of the optical waveguides causes the large optical loss, the interval between optical waveguides should be as large as it allows.

Generally, the experimental results show that a size of finger tip being touched on the touch screen is about 5000 μm, and a size of fingernail tip is about 500 μm. Thus, the interval (Δ) between each of the horizontal lines or between each of the vertical lines included in the core 200 is set to be in a range between 250 μm and 2 mm, and more preferably, 500 μm.

Figure 5:
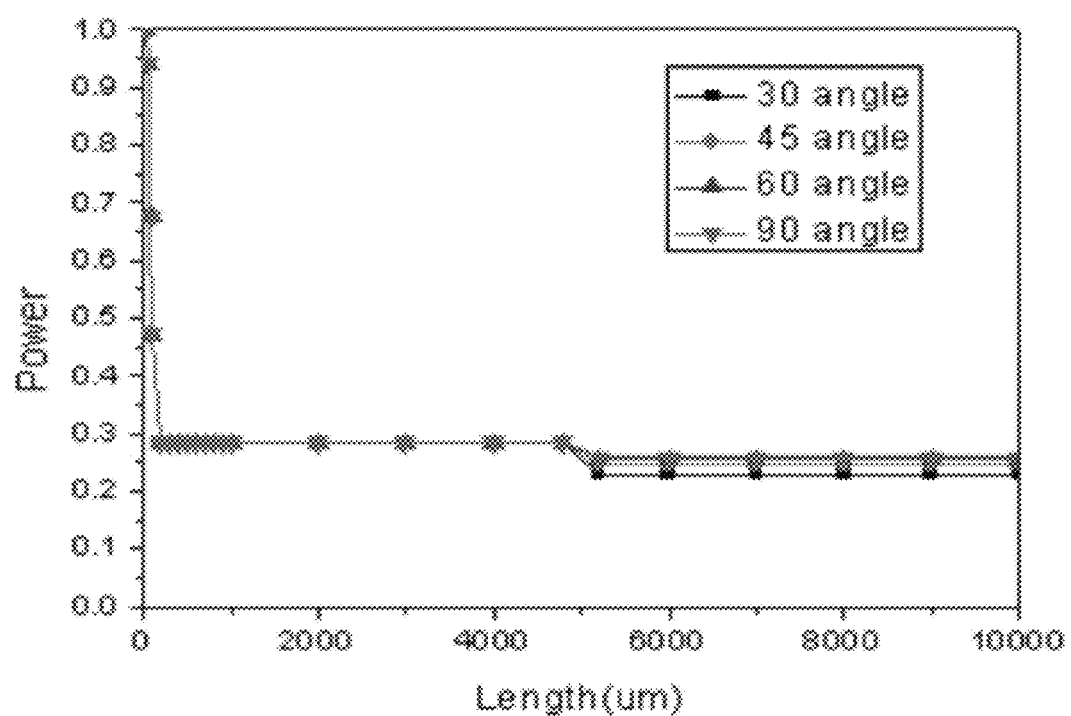
FIG. 5 is a graph illustrating a power distribution according to an intersection angle between horizontal and vertical lines in a core.

FIG. 5 is a graph illustrating the power distribution according to the change of length from the input end of the core 200 to the output end of the core 200 by the intersection angle between the horizontal and vertical lines included in the core 200.

Referring to FIG. 5, the optical loss can be minimized at the intersection angle of 90°, among the intersection angles of 30°, 45°, 60°, and 90°.

Thus, it is preferable that the horizontal and vertical lines included in the core 200 intersect at right angles with each other on the same plane.

Figure 6:
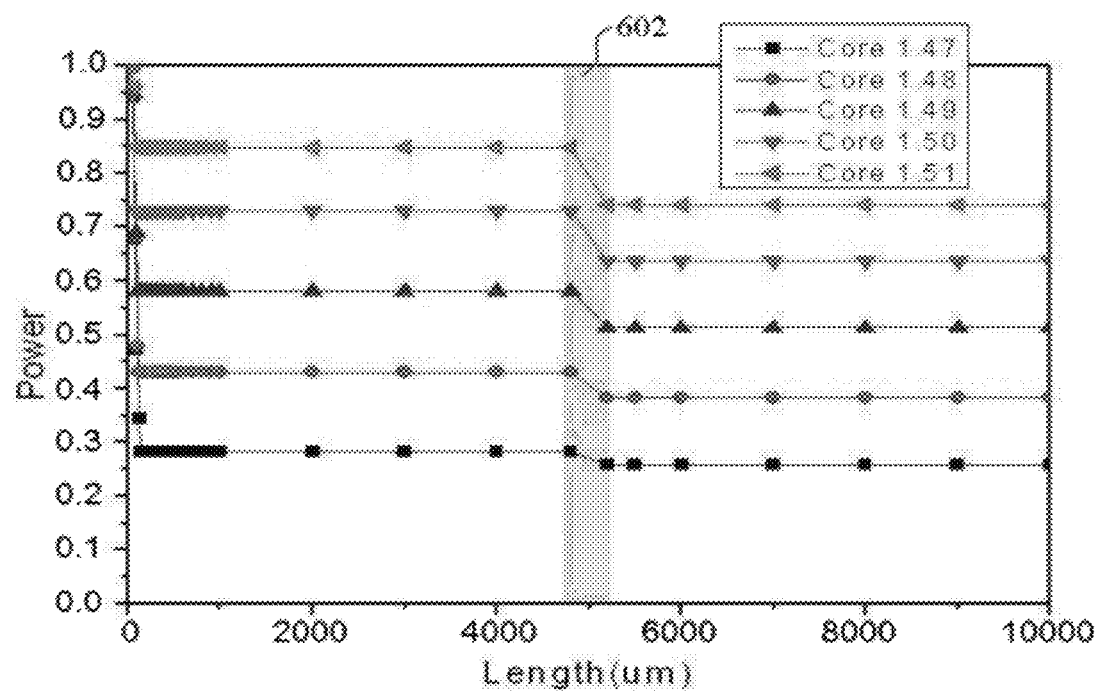
FIG. 6 is a graph illustrating a power distribution at an intersection point between horizontal and vertical lines according to refractive indices of core.

FIG. 6 is a graph illustrating the power distribution at the intersection point between the horizontal and vertical lines according to the refractive indices of the core 200. In this case, the refractive index of the clad 100 is set at 1.45.

Referring to FIG. 6, if there is no intersection point between the horizontal and vertical lines, the optical loss is decreased with the increased difference of refractive index between the clad 100 and the core 200. However, after passing the intersection point 600 between the horizontal and vertical lines, the optical loss in the output end is increased with the increased difference of refractive index between the clad 100 and the core 200.

Especially, if the highly small-patterned grid is made for enhancing a spatial resolution, it can produce many intersection points. Thus, the refractive indices of the clad 100 and the core 200 should be controlled so as to minimize the optical loss at the intersection points.

Figure 7:
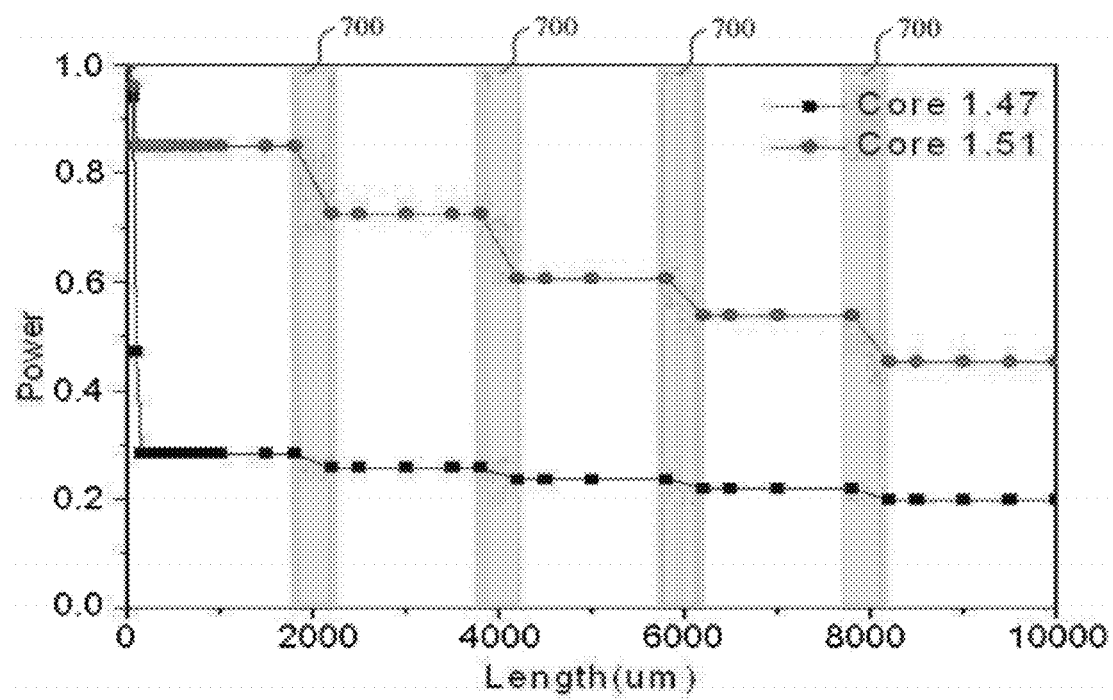
FIG. 7 is a graph illustrating a power distribution when the number of intersection points between horizontal and vertical lines is increased.

FIG. 7 is a graph illustrating the power distribution according to the light propagation when the number of intersection points between the horizontal and vertical lines is increased. In this case, the refractive index of the clad 100 is set at 1.45.

Referring to FIG. 7, the optical loss is generated whenever propagating through the intersection point between the horizontal and vertical lines. It is important to minimize the optical loss at the intersection point between the horizontal and vertical lines.

A method for minimizing the optical loss at the intersection point between the horizontal and vertical lines in the touch screen panel according to the present invention will be explained with reference to FIG. 8.

Figure 8A:
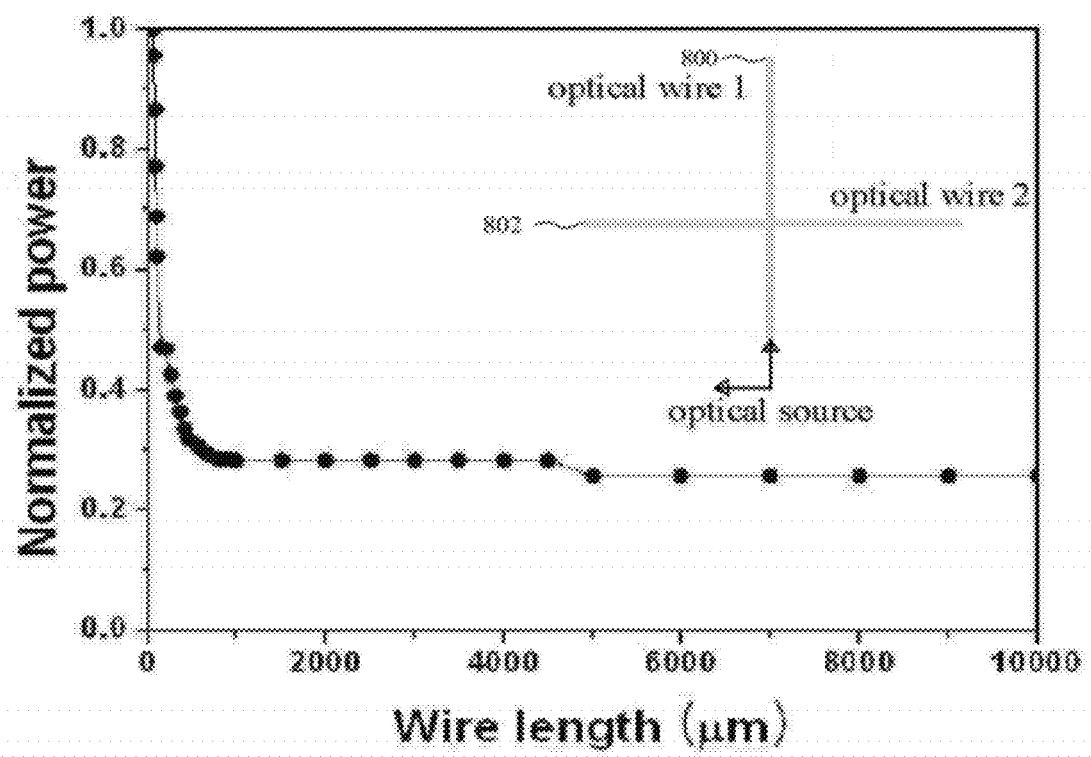
FIG. 8A is a graph illustrating a normalized power distribution in an intersection point of optical waveguide.
Figure 8B:
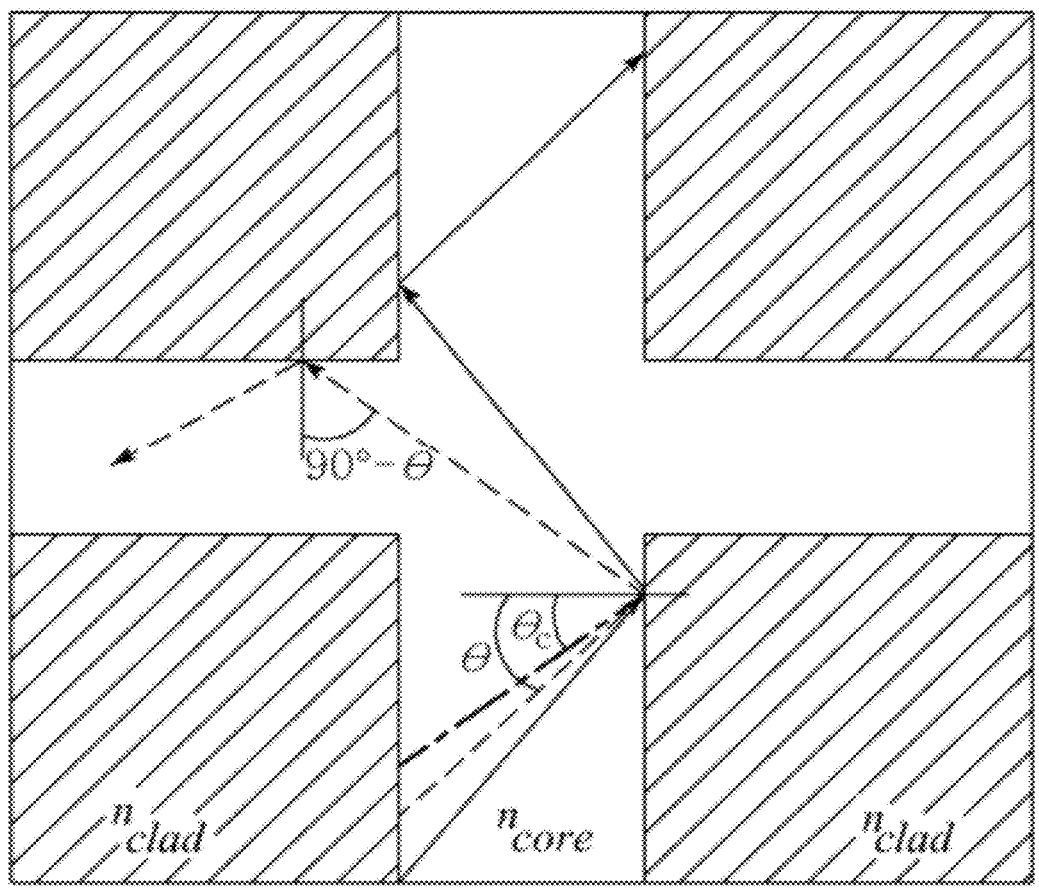
FIG. 8B illustrates an intersection point when a core is provided with horizontal and vertical lines which intersect at right angles with each other.
Figure 8C:
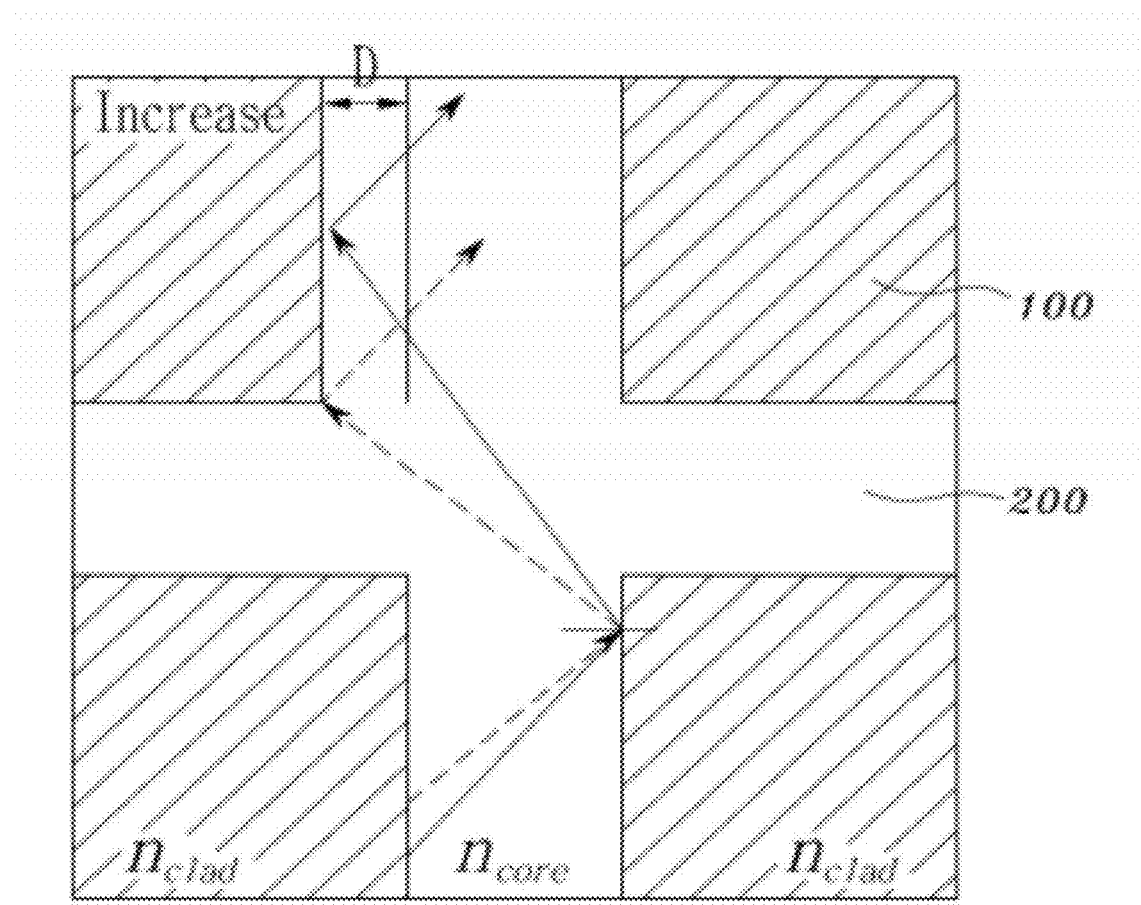
FIG. 8C illustrates an intersection point with an improved shape according to the present invention.
Figure 8D:
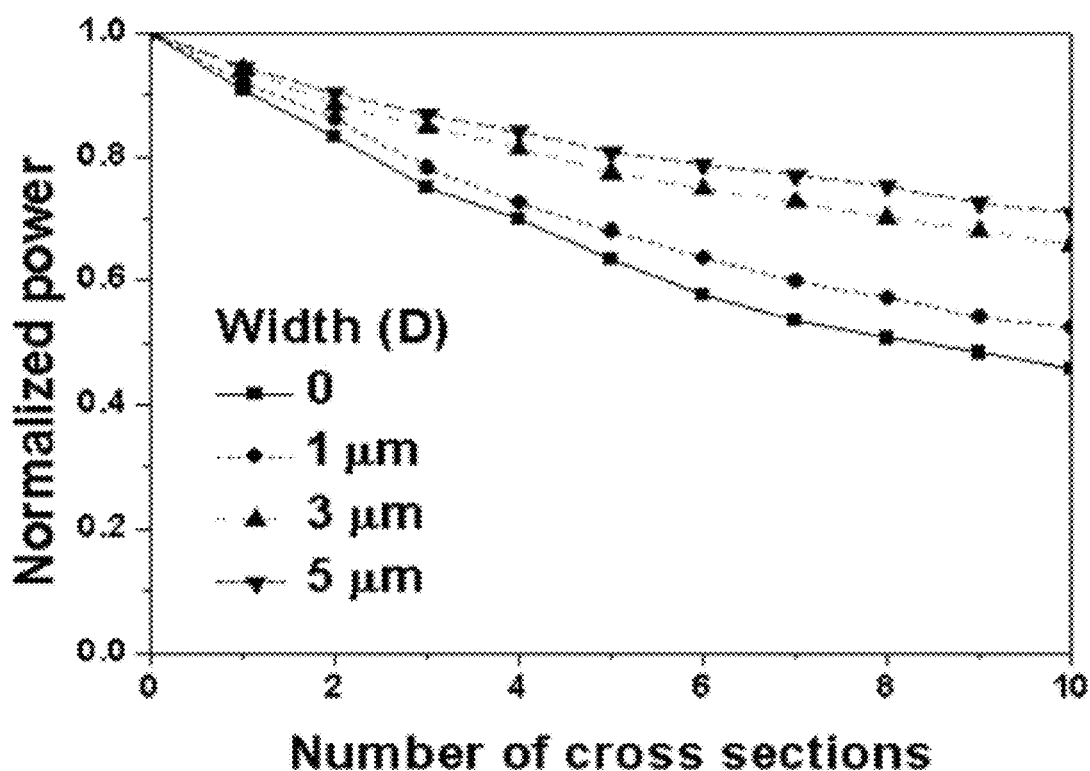
FIG. 8D is a graph illustrating a normalized power distribution when providing an intersection point with an improved shape according to the present invention.

FIG. 8A is a graph illustrating the normalized power distribution in the intersection point of the optical waveguide. FIG. 8B illustrates the intersection point when the core 200 is provided with the horizontal and vertical lines which intersect at right angles with each other. FIG. 8C illustrates the intersection point with the improved shape, according to the present invention, for preventing the optical loss. FIG. 8D is a graph illustrating the normalized power distribution when providing the intersection point with the improved shape according to the present invention.

In the graph of FIG. 8A, in order to understand the propagation properties in the intersection of the waveguide, the horizontal line having a length of 10 mm and the vertical line having a length of 10 mm intersect at right angles with each other, as shown in the upper right portion of FIG. 8A, wherein the refractive index of the core 200 is 1.47, and the refractive index of the clad 100 is 1.45.

FIG. 8A illustrates the normalized power by dividing the total number of incident rays into the number of rays existing in the cross section of the core 200.

In case of the rays propagating along the vertical line 800 of FIG. 8A, the optical loss is largely decreased to a predetermined point corresponding to a wire length of about 1000 μm, wherein the predetermined point indicates the wire length at which the optical loss is stabilized. Then, after passing through the intersection point between the horizontal and vertical lines, there is the additional optical loss of about 0.4 dB. As mentioned above, according as the difference of refractive index between the clad 100 and the core 200 becomes larger, the critical angle becomes smaller, whereby it tends to increase the optical loss at the intersection point.

Hereinafter, the optical power transited from the vertical line 800 to the horizontal line 802 will be defined as a crosstalk.

FIG. 8B illustrates the example of rays passing through the intersection point, that is, the wire length for stabilization of the optical loss, whereby the ray propagates at the incident angle (θ) which is larger than the critical angle (θ$_c$).

In FIG. 8B, a solid line indicates the ray continuously propagating through the intersection point, and a dotted line indicates the incident ray along the horizontal line. In case of the ray being incident along the horizontal line 802, the incident angle (90°−θ) is smaller than the critical angle (θ$_c$). Thus, it can not satisfy the propagation condition, whereby the crosstalk is '0'.

FIG. 8C illustrates the intersection point with the improved shape according to the present invention. In FIG. 8C, an optical wire is increased in its width by a fixed value after the intersection point. According as the width of vertical line are increased after the intersection point, the rays to be the crosstalk by the propagation along the horizontal line can be transited to the rays along the vertical line, whereby it is possible to propagate the rays without the crosstalk.

FIG. 8D is a graph illustrating the optical power distribution obtained by increasing the width of horizontal or vertical line, wherein the optical power is normalized in that it has the wire length for stabilization of the optical loss. Referring to FIG. 8D, the optical power is decreased after the intersection point. However, if increasing the width of horizontal or vertical line, the rate of decrease in the optical power is reduced.

Eventually, in order to minimize the rate of decrease in the optical power at the intersection point, a width of the horizontal or vertical line included in the core 200 may be increased from the input end of the core 200 to the output end of the core 200 whenever passing through the intersection point between the horizontal and vertical line, wherein the width of the horizontal or vertical line may be increased at a fixed value or at a fixed rate.

Referring once again to FIG. 1, the light emitted from the optical source 300 is applied to the input end of the core 200, and the applied light is transmitted to the receiver 400 after propagating through the output end of the core 200.

In one embodiment of the present invention, the optical source 300 may be provided for each of the horizontal and vertical lines included in the core 200. In another method, one optical source 300 may be provided, wherein one optical source 300 may be connected with the core 200 through the use of connectors shown in FIG. 11.

Figure 11:
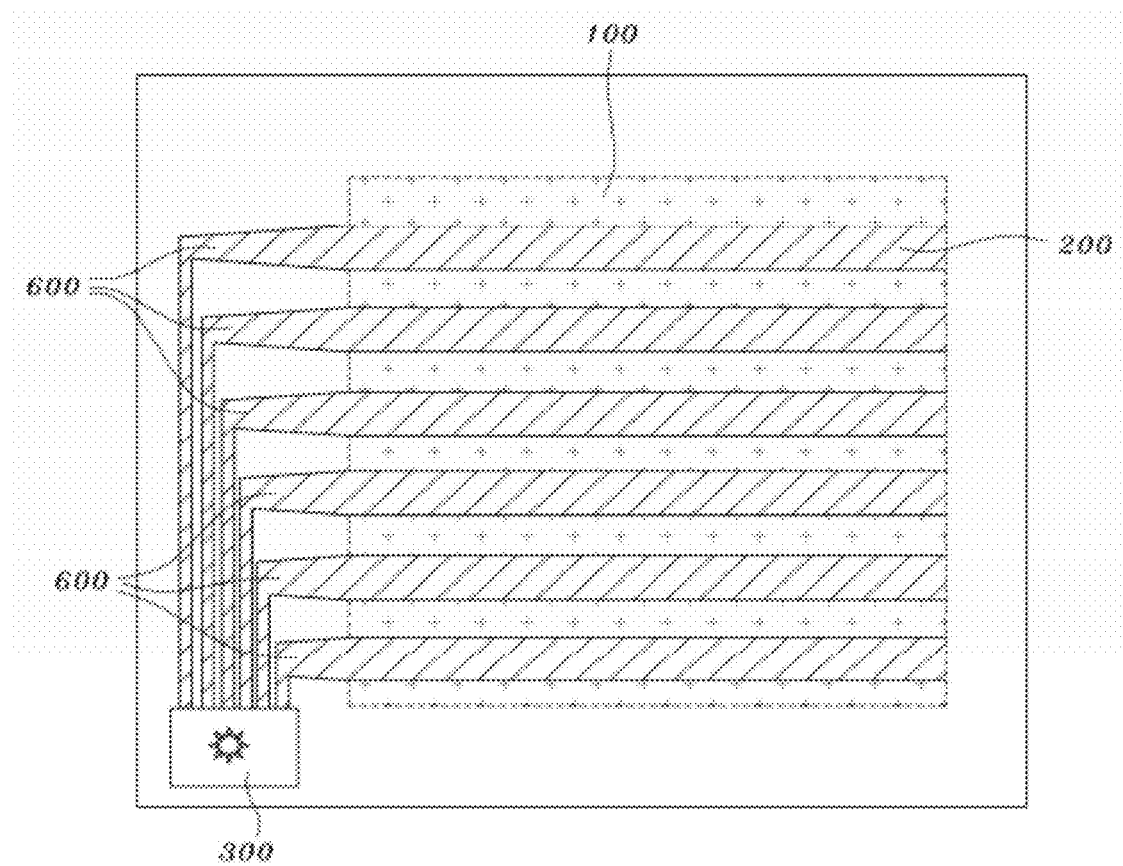
FIG. 11 illustrates one exemplary connector to connect a core with an optical source in a touch screen panel according to the present invention.

FIG. 11 illustrates the exemplary connector to connect the optical source with the core in the touch screen panel according to the present invention.

Referring to FIG. 11, the touch screen panel according to the present invention further includes one or more connection waveguides 600 which transmit the light emitted from one optical source 300 to the respective horizontal and vertical lines included in the core 200.

At this time, the connection waveguide 600 guides the light emitted from the optical source 300 to each of the lines included in the core 200, wherein the connection waveguide 600 is formed in a tapered shape. That is, the connection waveguide 600 is gradually increased in width from one side connected with the optical source 300 to the other side connected with the core 200.

Figure 12:
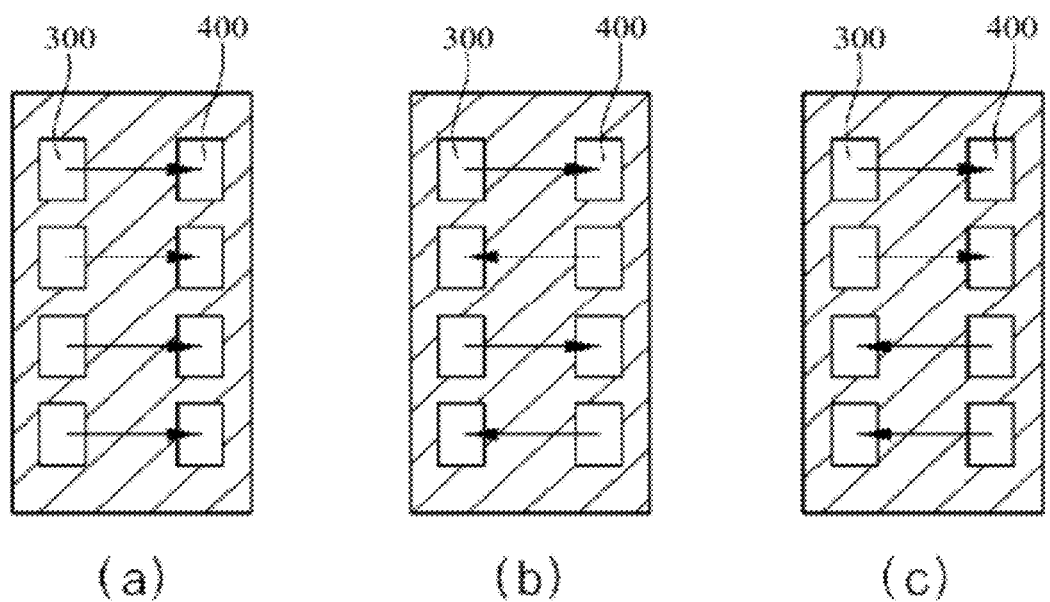
FIG. 12 illustrates exemplary arrangements of optical sources and receives in a touch screen panel according to the present invention.

FIG. 12 illustrates the exemplary arrangement of the optical source and the receiver in the touch screen panel according to one embodiment of the present invention.

Referring to FIG. 12, supposing that the plurality of optical sources 300 and receiver 400 are provided in the touch screen panel according to the present invention. In FIG. 12, the case (a) shows that the plurality of optical sources 300 are aligned along one side of the touch screen panel and the plurality of receivers 400 are aligned along an opposite side of the touch screen panel; the case (b) shows that the plurality of optical sources 300 and receivers 400 regularly alternates with each other along each of the two opposite sides of the touch screen panel; and the case (c) shows that the plurality of optical sources 300 and receivers 400 irregularly alternates with each other along each of two opposite sides of the touch screen panel.

In (a) of FIG. 12, the plurality of optical sources 300 are aligned at one side of the touch screen panel, and the plurality of receivers 400 are aligned at the opposite side of the touch screen panel, whereby the light propagates at the same direction in all horizontal lines or all vertical lines.

In (b) of FIG. 12, the plurality of optical sources 300 and receivers 400 are arranged by the regular alternation order at each of the two opposite sides of the touch screen panel, whereby the light alternately propagates at opposite directions by each line.

In (c) of FIG. 12, the plurality of optical sources 300 and receivers 400 are arranged by the irregular alternation order at each of the two opposite sides of the touch screen panel, whereby the light propagates at a first direction in the two or more lines, and the then the light propagates at a second direction being opposite to the first direction in the following two or more lines.

In the aforementioned embodiment of the present invention, the direction of light propagation can be controlled through the use of plurality of optical sources. In a modified embodiment of the present invention, the direction of light propagation can be controlled through the use of one optical source. When using one optical source, the connection waveguide may be used so as to connect the optical source with the respective lines.

The receiver 400 is connected with the output end of each of the horizontal and vertical lines, whereby the receiver 400 senses the intensity of light, emitted from the optical source 300, propagating through the output end of each of the horizontal and vertical lines.

When there is the presence of touch, the change of power sensed by the receiver 400 will be explained with reference to FIGS. 16 and 17.

Figure 16:
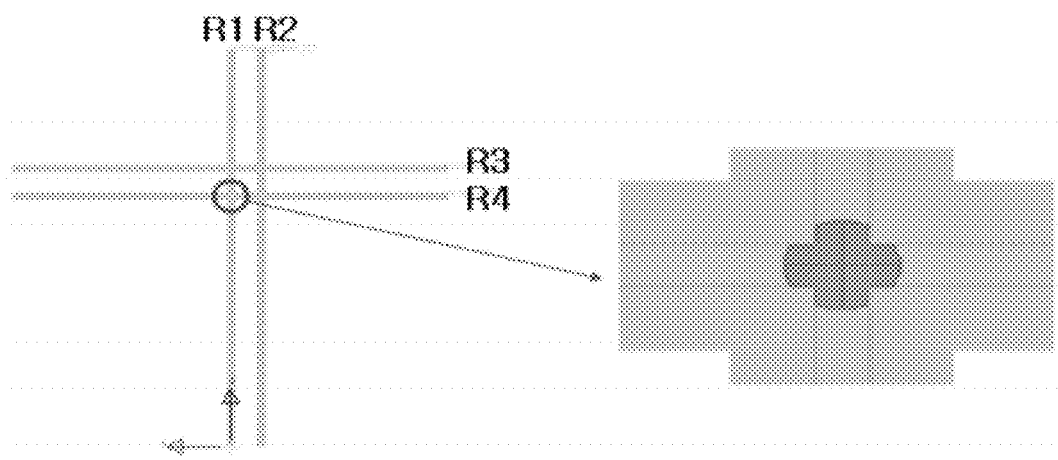
FIGS. 16 and 17 illustrate a change in power when there is the presence of touch.
Figure 17:
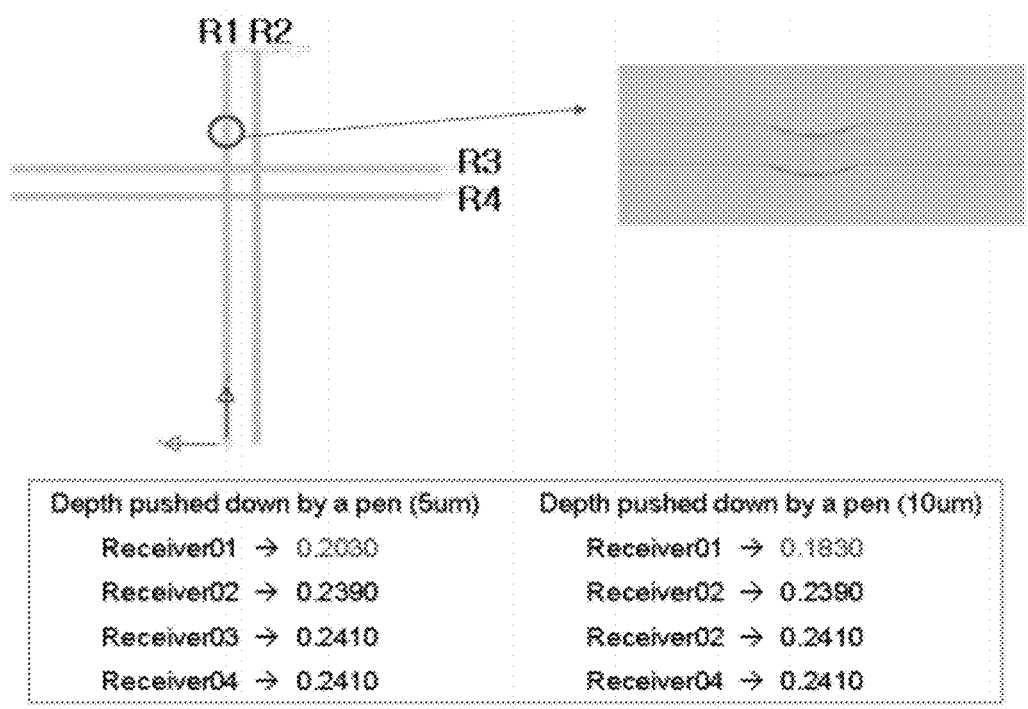

FIGS. 16 and 17 illustrate the change of power when there is the presence of touch. FIGS. 16 and 17 illustrate the exemplary case forming the core line comprised of the two horizontal lines and the two vertical lines.

First, referring to FIG. 16, it is known that the power measured in the receiver 1 (R1) and receiver 4 (R4) is decreased when the first and fourth waveguides are touched. As a touched depth is increased, that is, the core is changed in its shape more, the optical power measured in the receiver 400 becomes weaker.

Next, as shown in FIG. 17, it is known that the power measured in the receiver 1 (R1) is measured when the first waveguide is touched. As a touched depth is increased, that is, the core is changed in its shape more, the optical power measured in the receiver 400 becomes weaker.

Hereinafter, an operation principle of the aforementioned touch screen panel will be briefly explained with reference to the touch screen panel shown in FIG. 2.

In case of the touch screen panel shown in FIG. 2, since the core 200 is completely inserted into the inside of the clad 100, and both the clad 100 and the core 200 are formed of the elastic material, both the clad 100 and the core 200 are changed in their shapes by the touch of hand or pen.

The shape of core 200 is changed in the horizontal and vertical lines of the touched portion. Thus, even though the beam satisfies the TIR condition before the change in shape of the core 200, the incident angle of the ray may be changed after the change in shape of the core 200. In this case, the ray can not satisfy the TIR condition, thereby causing the loss of incident light to the input end of the core 200. Accordingly, the receiver 400 connected with the output end of the corresponding horizontal and vertical lines senses the relatively-small intensity or amount of light compared with that of the non-touched portion, whereby a control module (not shown) can be aware of the presence of touch by detecting the difference in amount of light or the intensity of optical signal.

In one embodiment of the present invention, the presence of touch can be detected by comparing the difference in amount of light among the plurality of receivers 400.

In a modified embodiment of the present invention, an initial light intensity (hereinafter, referred to as "first light-intensity") is memorized in each of the receivers by an initial procedure for driving the touch screen panel, and then a light intensity is sensed by each of the receivers after the initial procedure (hereinafter, referred to as "second light-intensity"). After a difference between the first light-intensity and the second light-intensity is higher than a reference value (for example, the second light-intensity is reduced 70% for the first light-intensity), it can be aware of the presence of touch. Also, the coordinates of the touched portion can be easily known by detecting the location of receiver whose light-intensity or light amount is lowered.

The aforementioned embodiment of the present invention discloses that the core 200 is completely inserted into the inside of the clad 100. However, a touch screen panel according to a modified embodiment of the present invention discloses that one surface of the core 200 is exposed to the atmosphere, instead of completely inserting the core 200 into the inside of the clad 100. Hereinafter, a structure and operation of the touch screen panel according to the modified embodiment of the present invention will be explained with reference to FIGS. 13 and 14.

Figure 13:
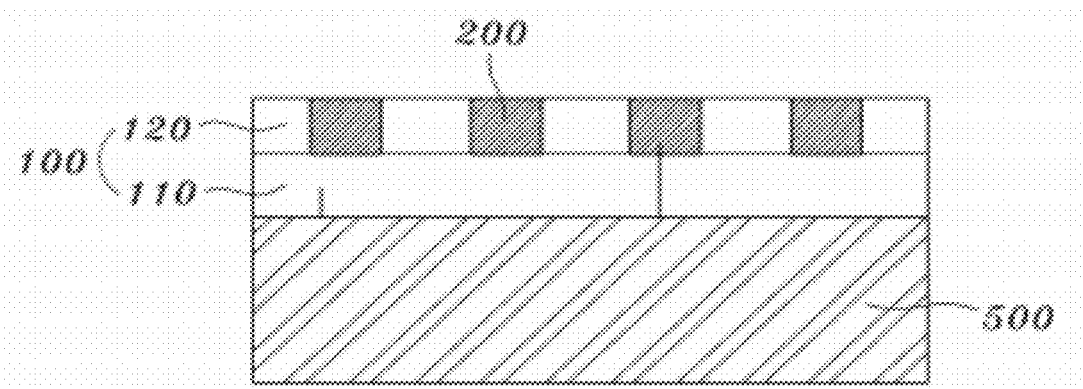
FIGS. 13 to 15 illustrate various examples of touch screen panel according to the modified embodiment of the present invention.

First, referring to FIG. 13, the touch screen panel according to the modified embodiment of the present invention includes a core 200 whose one surface is exposed to the atmosphere. That is, in comparison with the touch screen panel of FIG. 2, the touch screen panel according to the modified embodiment of the present invention shown in FIG. 13 includes the structure in which a clad covering an upper surface of the core 200 is removed.

In more detail, a lower clad 110 is formed on an entire surface of a display panel 500, wherein the lower clad 110 is provided at a predetermined thickness. Then, the core 200 in a grid shape is formed thereon. In this case, an intermediate clad 120 is formed between each of gaps included in the grid shape of the core 200, wherein a height of the intermediate clad 120 is identical to a height of the core 200. At this time, refractive indices in the intermediate clad 120 and the lower clad 110 are lower than a refractive index in the core 200, wherein the refractive index in the lower clad 110 may be the same as the refractive index in the intermediate clad 120, or the refractive index in the lower clad 110 may be different from the refractive index in the intermediate clad 120.

The core 200 or the clad 110 and 120 may be formed of a rigid material or an elastic material.

If forming the core 200 or the clad 110 and 120 of the rigid material, the presence of touch can be detected by a following method.

When a user's hand or touch pen is touched on a portion of one exposed surface of the core 200, a change of boundary condition is occurred in the touched portion, for example, change in the refractive index. Thus, the touched portion has a loss of light propagating the inside of the core 200. Accordingly, receivers 400 connected with horizontal and vertical lines corresponding to the touched portion can sense a relatively-small intensity or amount of light as compared with that of a non-touched portion, whereby a control module can determine that the corresponding coordinates on the touch screen panel is touched.

If the core 200 or the clad 110 and 120 is formed of the elastic material, the presence of touch and the location of touched portion can be detected through the aforementioned change in the boundary condition. Also, the presence of touch and the location of touched portion may be detected by the same method explained with reference to the touch screen panel shown in FIG. 2.

Figure 14:
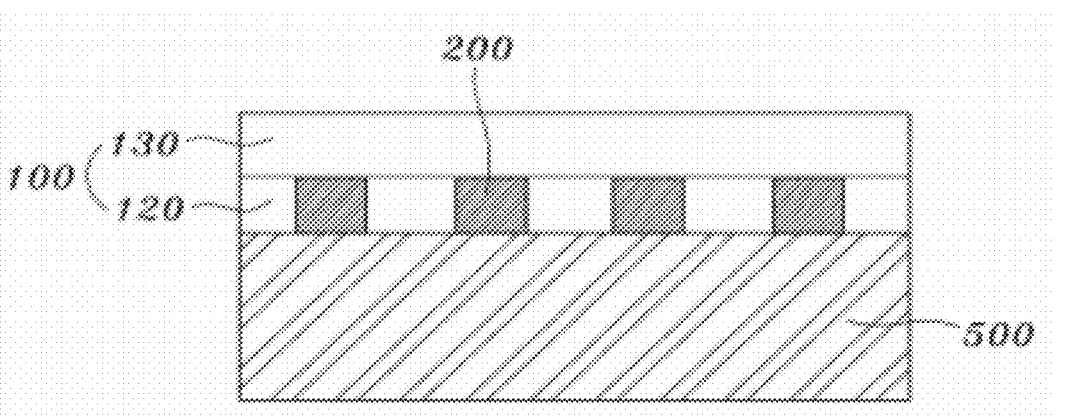
Figure 15:
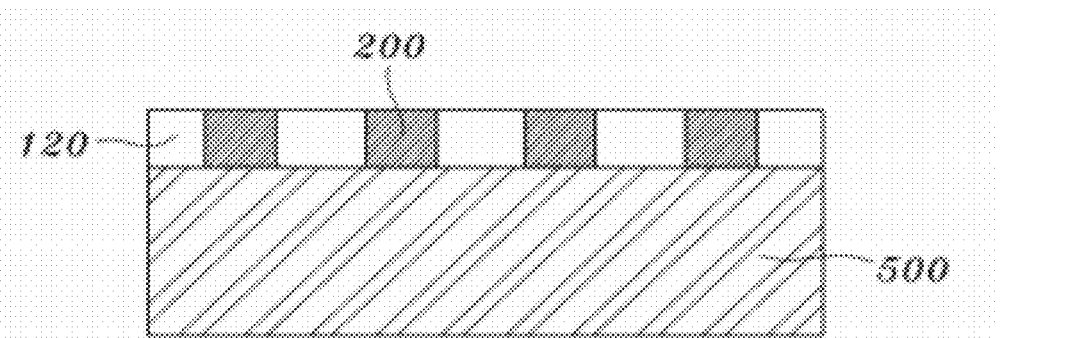

Next, the touch screen panel of FIG. 14 is comprised of a display panel which functions as a lower clad, without forming the lower clad. That is, in comparison to the touch screen panel of FIG. 2, the touch screen panel of FIG. 15 is manufactured by removing the clad supporting the lower side of the core.

In more detail, a core 200 of a grid shape is formed on an entire surface of the display panel 500. Then, an intermediate clad 120 is formed between each of gaps included in the grid shape of the core 200, wherein a height of the intermediate clad 120 is identical to a height of the core 120. Then, an upper clad 130 is formed on the core 200 and the intermediate clad 120.

At this time, refractive indices in the intermediate clad 120 and the upper clad 130 are lower than a refractive index in the core 200, wherein the refractive index in the upper clad 130 may be the same as the refractive index in the intermediate clad 120, or the refractive index in the upper clad 130 may be different from the refractive index in the intermediate clad 120.

In this case, since the core 200 and the clad 100 are formed of an elastic material, the presence of touch and the location of touched portion can be determined by the same method explained with reference to the touch screen panel shown in FIG. 2, whereby the detailed explanation will be omitted.

Next, the touch screen panel of FIG. 15 is characterized in that one surface of a core 200 is exposed to the atmosphere, and a display panel functions as a lower clad without forming the lower clad. That is, in comparison to the touch screen panel of FIG. 2, the touch screen panel of FIG. 15 is manufactured by removing the upper clad covering the core and the lower clad supporting the lower side of the core.

In more detail, the core 200 of a grid shape is formed on an entire surface of the display panel 500. Then, an intermediate clad 120 is formed between each of gaps included in the grid shape of the core 200, wherein a height of the intermediate clad 120 is identical to a height of the core 120.

At this time, a refractive index in the intermediate clad 120 is lower than a refractive index in the core 200. The core 200 or the clad 120 may be formed of a rigid material or an elastic material.

In this case, the presence of touch and the location of touched portion can be determined by the same method explained with reference to the touch screen panel shown in FIG. 13, whereby the detailed explanation will be omitted.

Accordingly, the touch screen panel according to the present invention has the following advantages.

The touch screen panel according to the present invention is comprised of the optical grid using the optical waveguides comprised of the core and the clad. Then, when touching the optical grid or applying a predetermined pressure to the optical grid, the touched position and the pressure applied to the touched position can be precisely detected with the minimized error, through the use of information showing the lowered intensity of output light according to the change in boundary condition or waveguide condition caused due to the change of core or clad.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch screen panel comprising:
a core including a plurality of horizontal and vertical lines provided in a grid shape, wherein the core has a first refractive index, and an upper surface of the core is exposed to the atmosphere;
an intermediate clad formed between each of gaps included in the core, wherein the intermediate clad has a second refractive index which is lower than the first refractive index, and a height of the intermediate clad is identical to a height of the core;
an optical source configured to apply an optical signal to an input end of each of the plurality of horizontal and vertical lines; and
a plurality of receivers configured to sense an intensity of the optical signal passing through an output end of each of the plurality of horizontal and vertical lines, the optical signal applied by the optical source,
wherein a width of the horizontal or vertical lines is increased by a fixed rate at a direction from the input end to the output end whenever passing through the intersection point between the horizontal and vertical lines.

2. The touch screen panel according to claim 1, further comprising a lower clad formed on an entire surface of a display panel,
wherein the lower clad has a third refractive index which is lower than the first refractive index,
wherein the core and the intermediate clad are formed on the lower clad.

3. The touch screen panel according to claim 1, wherein the core and the intermediate clad are formed of an elastic material,
wherein the touch screen panel senses the presence of touch and an exact position of touched point by detecting a change of the intensity in the optical signal generated due to a change of the core when an object is touched on the core or a predetermined pressure is applied to the core.

4. The touch screen panel according to claim 1, wherein an optical waveguide comprised of the core and the intermediate clad has a single-mode or a multi-mode.

5. The touch screen panel according to claim 1, wherein the core and the intermediate clad are formed of a transparent material.

6. The touch screen panel according to claim 1, wherein the plurality of horizontal and vertical lines are provided on the same plane, wherein the horizontal and vertical lines intersect at right angles with each other.

7. The touch screen panel according to claim 1, wherein the core has a step or graded index distribution.

8. The touch screen panel according to claim 1, wherein the input end or output end are formed in shape of an inclined surface, an inclined surface with a mirror thereon, or a convex-shaped inclined surface.

9. The touch screen panel according to claim 8, wherein the optical source applies the optical signal to the inclined surface from a lower side of the input end.

10. The touch screen panel according to claim 1, wherein the output end of each of the plurality of horizontal and vertical lines is protruded out of the intermediate clad, and is then exposed to the atmosphere.

11. The touch screen panel according to claim 1, further comprising one or more connection waveguides configured to transmit the optical signal from the optical source to the input end of each of the plurality of horizontal or vertical lines.

12. The touch screen panel according to claim 1, wherein when the optical source is a plurality, the plurality of optical source are aligned along one side of the touch screen panel and the plurality of receivers are aligned along an opposite side of the touch screen panel so as to make the optical signal propagating at the same direction in all horizontal lines or all vertical lines.

13. The touch screen panel according to claim 1, wherein the optical source is a plurality, the plurality of optical source and receivers alternates with each other along each of the two opposite sides of the touch screen panel so as to make the optical signal alternately propagating at opposite directions by each line, or so as to make the optical signal propagating at a first direction in the two or more lines and propagating at a second direction being opposite to the first direction in the following two or more lines.

14. The touch screen panel according to claim 1, wherein the intermediate clad is formed of a material which is capable of absorbing infrared rays.

15. The touch screen panel according to claim 1, wherein the first and second refractive indices are set in a range from 1.3 to 1.7.

16. A touch screen panel comprising:
a core including a plurality of horizontal and vertical lines provided in a grid shape, wherein the core has a first refractive index;
an intermediate clad formed between each of gaps included in the core, wherein the intermediate clad has a second refractive index which is lower than the first refractive index, and a height of the intermediate clad is identical to a height of the core;

an upper clad formed on the core and the intermediate clad so as to cover the core and the intermediate clad, wherein the upper clad has a fourth refractive index which is lower than the first refractive index;

an optical source configured to apply an optical signal to an input end of each of the plurality of horizontal and vertical lines; and a plurality of receivers configured to sense an intensity of the optical signal passing through an output end of each of the plurality of horizontal and vertical lines, the optical signal applied by the optical source.

17. The touch screen panel according to claim 16, further comprising a lower clad formed on an entire surface of a display panel, wherein the lower clad has a third refractive index which is lower than the first refractive index, wherein the core and the intermediate clad are formed on the lower clad.

18. The touch screen panel according to claim 17, wherein the second refractive index, the third refractive index, and the fourth refractive index are numerically identical; and the intermediate clad, the upper clad, and the lower clad are formed as one body.

19. The touch screen panel according to claim 16, wherein the core, the intermediate clad, and the upper clad are formed of an elastic material, wherein the touch screen panel senses the presence of touch and an exact position of touched point by detecting a change of the intensity in the optical signal generated due to changes of the core and the upper clad when an object is touched on the upper clad or a predetermined pressure is applied to the upper clad.

* * * * *

UNITED STATES PATENT AND TRADEMARK OFFICE
CERTIFICATE OF CORRECTION

PATENT NO.        : 8,248,388 B2
APPLICATION NO.   : 12/392265
DATED             : August 21, 2012
INVENTOR(S)       : Dae Seo Park et al.

It is certified that error appears in the above-identified patent and that said Letters Patent is hereby corrected as shown below:

On the Title Page, item [75] Inventors: Delete "Kwam Su Choi" and insert -- Kwan Su Choi --

Signed and Sealed this
Sixth Day of November, 2012

David J. Kappos
*Director of the United States Patent and Trademark Office*